H. W. HENRY.
VEHICLE WHEEL.
APPLICATION FILED AUG. 31, 1910.

1,019,896.

Patented Mar. 12, 1912.
2 SHEETS—SHEET 1.

Witnesses:
Frank B. Wooden,
R. M. Elliott.

Hayes W. Henry
Inventor,
by C. A. Snow & Co.
Attorneys.

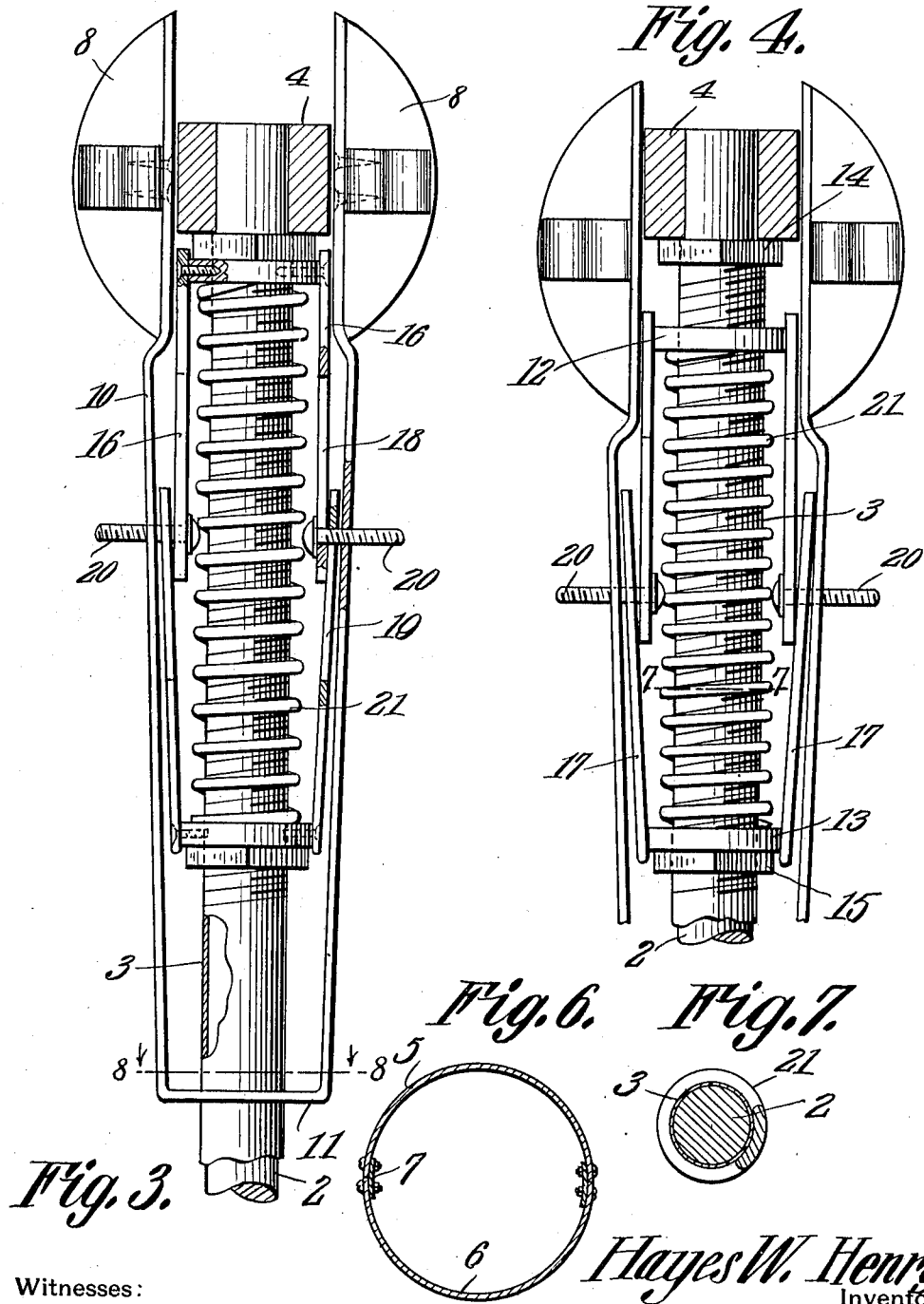

UNITED STATES PATENT OFFICE.

HAYES W. HENRY, OF MELVERN, KANSAS.

VEHICLE-WHEEL.

1,019,896. Specification of Letters Patent. Patented Mar. 12, 1912.

Application filed August 31, 1910. Serial No. 579,797.

*To all whom it may concern:*

Be it known that I, HAYES W. HENRY, a citizen of the United States, residing at Melvern, in the county of Osage and State of Kansas, have invented a new and useful Vehicle-Wheel, of which the following is a specification.

This invention relates to vehicle wheels.

The object of the invention is to provide a wheel which shall possess all of the advantages of one of the pneumatic type without the disadvantages.

A further object is to so arrange the parts of the wheel that all jars and shocks shall be absorbed in a manner that will not only serve to protect the wheel from raking, but will also cause the wheel to be as smooth running as one provided with a pneumatic tire.

A further object is to construct and assemble the parts of the wheel in such manner as to insure durability in use, and facilitate repairs when necessary.

With the above and other objects in view, as will appear as the nature of the invention is better understood, the same consists in the novel construction and combination of parts of a vehicle wheel, as will be hereinafter fully described and claimed.

Figure 1:
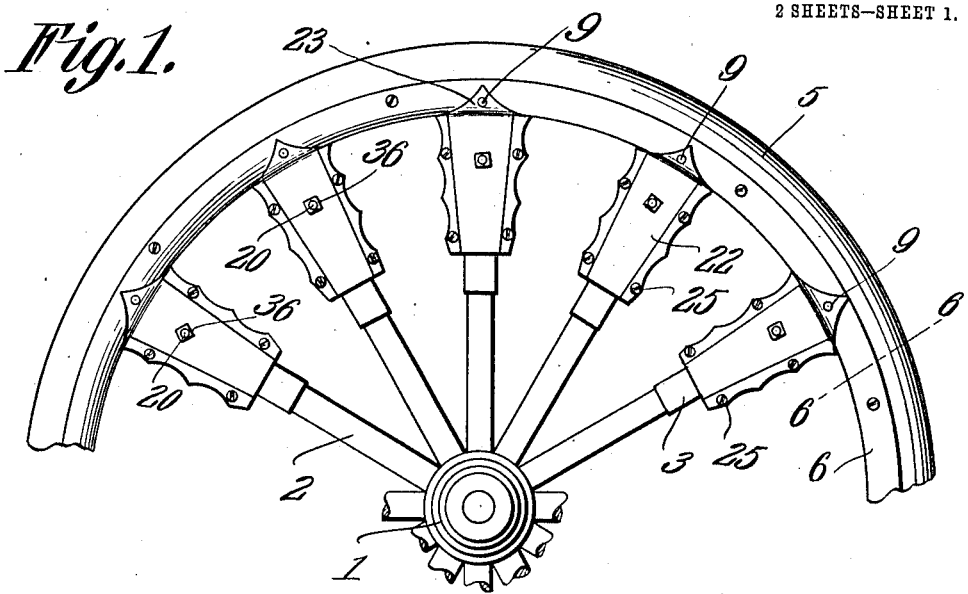
Figure 2:
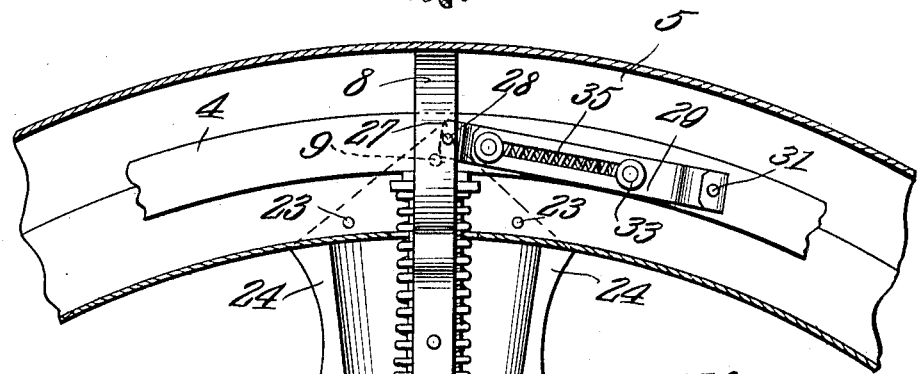
Figure 5:
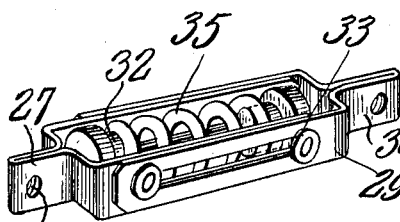
Figure 8:
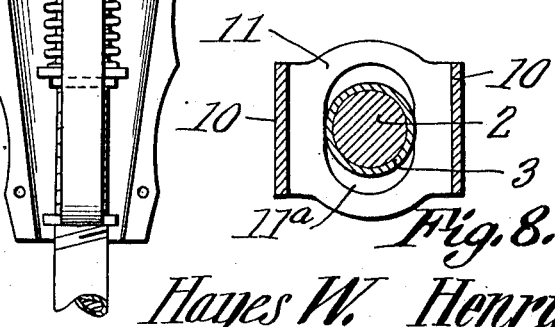

In the accompanying drawings, forming a part of this specification, and in which like characters of reference indicate corresponding parts: Figure 1 is a side elevation of a wheel constructed in accordance with the present invention. Fig. 2 is an enlarged sectional detail view showing the interior of a portion of the wheel. Fig. 3 is a detail view of a spoke and the felly, showing the normal position of the parts. Fig. 4 is a similar view showing the position of the parts exhibited in Fig. 3 when under compressive strain. Fig. 5 is a detail view of a strain equalizer. Fig. 6 is a transverse sectional view taken on the line 6—6 Fig. 1. Fig. 7 is a transverse sectional view taken on the line 7—7 Fig. 4. Fig. 8 is a section on the line 8—8 of Fig. 3.

Referring to the drawings, 1 designates a hub of any preferred form, and 2 the spokes, which in this instance are of wood, and each has a length of its portion sheathed in a metallic sleeve 3 for a purpose that will presently appear. The outer ends of the spokes are seated in a wooden felly 4 which is disconnected from the tire, or rather the tread of the tire, in order to allow the two parts to have movement independently of each other.

The tire comprises a metallic tread 5 and a metallic rim 6 each being approximately semi-circular in cross section, and held assembled at their meeting edges by reinforcing strips 7 which are bolted or otherwise secured to the interior of the two parts. Secured to the interior of the tread and rim at distances apart equal to the space between the outer ends of the spokes are pairs of filler blocks 8, which may be of any material suitable for the purpose, and which are held in position by bolts or screws 9 that also pass through the rim, and are removable from the exterior thereof when necessary. Secured to the inner faces of each pair of filler blocks are the two arms of a yoke 10, the bend 11 of which is provided with an elongated orifice 11$^a$ through which passes the spoke 2, and it is to protect the spoke from wear by contact with the walls of the orifice that the metallic sleeve 3 is provided.

As will be seen by reference to Figs. 3 and 4, the felly is disposed between the filler blocks and is out of contact with the adjacent portions of the yoke thus to insure ready sliding movement of the tire relatively to the felly without any objectionable frictional contact between the parts. Mounted upon the spoke are two collars 12 and 13, which freely slide thereon, and are limited in their upward and downward movements by jam-nuts 14 and 15 that are threaded on the spoke, as clearly shown in Figs. 3 and 4. Pivoted to opposite sides of the collar 12 are two slide bars 16, and pivoted to opposite sides of the collar 13 are two similar bars 17, and these two sets of bars overlap and are provided with longitudinal slots 18 and 19, respectively, which are engaged by screws 20, the heads of which bear against the inner faces of the slide bars 16 and the shanks of which project outward through openings in the arms of the yoke. Arranged upon that portion of the spoke between the collars 12 and 13 is a coiled spring 21 the terminals of which bear against the collars as clearly shown in Figs. 3 and 4, and the tension of this spring may readily be adjusted by manipulating the jam-nuts 14 and 15 as required. In order to shield that portion of the spoke including the spring, slide bars and yoke, from dust and moisture, there is a housing 22 provided which incloses the parts named, and is secured to the rim at its outer end, by screws 23 and 9. The housing is in two sections, and each is provided with flanges 24, and the two sets of flanges are held firmly assembled by screws or bolts 25.

As a means for equalizing the strains between the felly and rim, the form of equalizer shown in Fig. 5 is employed, four being used on connection with the felly and each pair of filler blocks. The equalizer comprises in part two slide bars the ends of which are brought together to form a two-part tongue 27 that is pivoted at 28 in a slot formed in the adjacent filler block. Two other slide bars 29 complete the frame of the equalizer, the ends of which are also brought together to form a two-part tongue 30 which is bolted to a bracket 31 secured to the felly, as shown in Fig. 2. The overlapped portions of the slide bars are slotted, and arranged between the bars are two plugs 32 that are held in operative position relative to the equalizer by bolts 33 that pass through the slots, the bolts also serving to maintain the two sets of slide bars in operative relation. The opposed faces of the plugs are provided with lugs that are engaged by the terminal coils of a spiral spring 35 that operates normally to maintain the plugs in the position shown in Fig. 5. It will be seen that by the employment of these equalizers a large portion of the strain or shocks to which the tread is subjected in skidding will be absorbed, thus to obviate raking of the wheel to a large extent. When the wheel is running, the pressure on the tire is transmitted by the filler blocks to the yoke 10, and the latter through the bolts 20 to the two sets of slide bars 16 and 17, causing the two collars 12 and 13 to approach each other and thus compress the spring 21, with the result that shocks and jars are positively absorbed. It will be seen that the radial movement of the tire with respect to the felly either outward or inward from normal position will compress the spring 21, thus tending to return the tire to normal position. Upon the tire and felly moving longitudinally with respect to each other the bars 16 and 17 form a toggle joint thereby compressing the spring 21 to assist the spring 35 in returning the said parts to normal position. Thus it will be seen that the springs 21 around the wheel will be continually under compression as the wheel is in use thus adding to the efficiency of the wheel. In order to brace the screws or bolts 20 at their outer terminals, these extend through the walls of the housing 22 and carry nuts 36, as shown in Fig. 1.

It will be seen from the foregoing description that while the improvements herein set forth are simple in character, they will be thoroughly efficient in securing the object sought, and will result in the presentation of a smooth and easy riding wheel.

What I claim is:

1. A wheel comprising a tire, a felly, a spoke secured to the felly, a yoke secured to the tire, a pair of collars on the spoke, a coiled spring on the spoke between the collars and means connecting the said collars to the yoke whereby the spring is compressed upon a radial movement of the tire.

2. A wheel comprising a tire embodying a rim and a tread, a felly housed within but out of contact with the tire, spaced segmental filler blocks secured to the tire on each side of the felly, a yoke secured to the filler blocks, pairs of slide bars mounted on the spoke, a spring coacting with the slide bars, and bolts passing through the slide bars and the yoke whereby yielding of the tire will cause compression of the spring and thus the absorption of shocks.

3. A wheel comprising a tire, a felly, a spoke secured to the felly, a yoke secured to the tire, a pair of collars on the spoke, a coiled spring on the spoke between the collars, bars pivoted to the collars and having slots therein, and members passing through the said slots and engaging the yoke.

4. A wheel comprising a tire, a felly, a spoke secured to the felly, a yoke secured to the tire, a pair of collars on the spoke, a coiled spring on the spoke between the collars, adjustable members on the spoke to limit the movements of the respective collars, and means connecting the said collars to the yoke, whereby the spring is compressed upon a radial movement of the tire.

5. A wheel comprising a tire embodying a rim and a tread, a felly housed in but out of contact with the tire, spaced segmental filler blocks secured to the tire on each side of the felly, a yoke secured to the filler blocks and having an elongated opening in its bend, a spoke extending through said opening, pairs of slide bars arranged on each side of the spoke, a spring coacting with the slide bars, bolts passing through the slide bars and the yoke, and a housing around the yoke and secured in place by said bolts and by other bolts attaching to the rim.

In testimony that I claim the foregoing as my own, I have hereto affixed my signature in the presence of two witnesses.

HAYES W. HENRY.

Witnesses:
F. U. JUDD,
W. T. APPIER.

---

Copies of this patent may be obtained for five cents each, by addressing the "Commissioner of Patents, Washington, D. C."